United States Patent [19]

Akin et al.

[11] 4,167,591

[45] Sep. 11, 1979

[54] PROCESS FOR TEXTURIZING PROTEINS BY COAGULATION WITH SOLVENTS

[75] Inventors: Cavit Akin, Warrenville, Ill.; Franklin D. Darrington, Munster, Ind.

[73] Assignee: Standard Oil Company (Indiana), Chicago, Ill.

[21] Appl. No.: 821,350

[22] Filed: Aug. 3, 1977

[51] Int. Cl.$^2$ ............................................... A23J 3/00
[52] U.S. Cl. .................................... 426/656; 426/657; 426/802
[58] Field of Search .............. 426/574, 564, 656, 657, 426/104, 802

[56] References Cited

U.S. PATENT DOCUMENTS

| 3,627,536 | 12/1971 | Arima et al. | 426/802 X |
| 3,674,500 | 7/1972 | Nagasawa et al. | 426/802 X |
| 3,889,010 | 6/1975 | Brouwer | 426/802 X |
| 3,939,284 | 2/1976 | Akin et al. | 426/802 X |
| 4,045,590 | 8/1977 | Weigle | 426/802 X |

FOREIGN PATENT DOCUMENTS 47-22791  6/1972  Japan ..................................... 426/656

*Primary Examiner*—Robert A. Yoncoskie
*Attorney, Agent, or Firm*—Gregory E. Croft; Arthur G. Gilkes; William T. McClain

[57] ABSTRACT

A process for texturizing whole cell single-cell protein material which comprises mixing the proteinaceous material with a solvent-coagulable protein, adding a coagulating solvent to the mixture, whipping the mixture to incorporate microporous structure, and thermally fixing the texture by heat treating.

16 Claims, No Drawings

PROCESS FOR TEXTURIZING PROTEINS BY COAGULATION WITH SOLVENTS

BACKGROUND OF THE INVENTION

1. Field of the Invention

This invention relates to texturization processes for proteinaceous materials. More specifically, it relates to texturization of single-cell proteins and other powder-like protein products by solvent-induced coagulation.

2. Description of the Prior Art

Protein products are used in foods for their functionality as well as their nutritional value. The texture of a protein product contributes to its functionality as well as to its taste. Most vegetable protein products, e.g. soybean protein products, are in the form of powders or grits. A texturization technology has been developed to incorporate some textural characteristics to soybean proteins. One known process produces meat substitutes from edible protein materials by forming fibers or filaments and then, by suitable means, binding the fibers. These protein fibers are prepared from a spinning dope of protein which is forced through a porous membrane such as a spinneret to form fibers which are coagulated in a bath containing suitable acids and salts and are oriented by suitable means, such as by a series of rolls revolving at increasing speeds. The fibers are placed in a salt solution such as sodium chloride of sufficient concentration to prevent the fibers from dissolving.

Textured protein foods can also be produced without spinning. One such process involves the rapid orientation and coagulation of protein material in a substantially undenatured, finely-divided, hydrated state under conditions which produce a shred-like structure. Orientation and coagulation of protein must be coordinated so that coagulation follows orientation of the molecules, whereby upon the action of the coagulation influence the molecules are set in a shred-like condition. The process is conducted with about 50% slurry of the protein material in water. The slurry is rapidly heated to and maintained at 360° F. for about 1 minute in an autoclave and cooled rapidly. A shredded meatlike texture is obtained.

In various other processes mixtures of proteins are used in which one of these proteins serves as a binder. In such mixtures gluten or egg white is used as a heat coagulating ingredient to set the extruded or shredded protein textures.

In another process a chewy gel is prepared by (a) adjusting the composition of a protein-water system, in particular the pH and the solids content, to a composition conducive to gel formation, (b) the shaping of the system, and (c) applying the necessary heat to the adjusted system to produce a chewy gel. The shaping may take place before or after either of the other steps of the process. The final products produced in accordance with this process simulate the fibrous texture, chewiness and structure of meats such as pot roast, roast beef, or the like.

In all of these known protein food texturization processes spun or extruded fibers are produced in a coagulating bath, or in a gel system. The fibers then are bound together to imitate the fibrous texture and the mouthfeel of meats. Appropriate flavoring and seasoning agents are added as needed.

An effective texturization technique is needed for texturizing microbial cells, which are distinctly separate particles. We have now discovered a process whereby these distinctly separate particles can be texturized with the aid of a solvent-coagulable texturizing agent.

SUMMARY OF THE INVENTION

In one aspect, the invention resides in a process for texturizing proteinaceous materials, said process comprising mixing the proteinaceous material with a solvent-coagulable texturizing agent, adding a coagulating solvent to the mixture to effect coagulation, and thermally fixing the texture by heat treating. The proteinaceous material can be any protein-containing material having at least 15 percent protein and includes animal protein materials, vegetable protein materials, and single-cell protein materials such as bacteria and yeasts. The solvent-coagulable texturizing agent can be any proteinaceous substance which coagulates upon the addition of a suitable solvent and includes gelatin, protein concentrates, protein isolates, and mixtures thereof. Correspondingly, the coagulating solvent can be any solvent that effects coagulation of the proteinaceous mixture. Alcohols, preferably ethanol, are particularly effective. The heat treatment following coagulation serves to set the textured structure and render it non water-dispersible and can be carried out by any suitable means such as autoclaving or oven curing. The temperature range for effective heat treating can vary greatly with the material being treated, and those skilled in the texturization art will be able to determine the optimal conditions without undue experimentation. However, the temperature range is generally from about 80° to about 300° C. and more preferably from about 100° to about 250° C. If the heat treatment is accomplished by autoclaving, the treatment temperature may preferably be in the range of from about 120° to about 300° C. The treatment time will also vary, but generally will fall within about 0.5 minutes to about 45 minutes.

More specifically, the invention resides in a process for texturizing single-cell protein materials, said process comprising mixing a slurry of the single-cell protein material with a solvent-coagulable texturizing agent at a weight ratio of from about 9:1 to about 1:1, adding a coagulating solvent to the mixture in sufficient quantity to coagulate the mixture while simultaneously whipping the mixture to incorporate a microporous texture during coagulation, and thermally fixing the texture by heat treating the coagulated mixture at a temperature of from about 80° to about 250° C.

Still more specifically, the invention resides in a process for texturizing single-cell protein materials, said process comprising mixing an aqueous slurry containing about 10–20 weight percent of the single-cell material with a texturizing agent which is either gelatin, soy isolate, or a mixture thereof at a weight ratio of single-cell material to texturizing agent of from about 9:1 to about 1:1, adding ethanol in sufficient quantity to coagulate the mixture while whipping the mixture to incorporate a microporous texture during coagulation, and thermally fixing the texture by heat treating the coagulated mixture at a temperature of from about 80° to about 250° C. The final textured product can be produced by drying the whipped mixture in an oven prior to heat treating or it can be produced by autoclaving the whipped mixture in an alcohol and then drying to yield the final product. A preferred single-cell protein material is a yeast such as *Candida utilis*.

In a further aspect, the invention resides in the textured products resulting from the aforementioned processes and those illustrated in the following examples.

DESCRIPTION OF THE PREFERRED EMBODIMENTS

The following examples will serve to illustrate various aspects of this invention without implied limitation.

EXAMPLE 1

*Candida utilis* (Torula yeast) was grown in a continuous fermentor in an aqueous ethanol and minerals medium. The cell suspension was concentrated to about 6–12% dry weight slurry and the aqueous slurry was mixed with gelatin at a cell to gelatin dry weight ratio of 3/1 at 70° C. The mixture was cooled to about 30° C. and ethanol was added while whipping the mixture. Upon addition of ethanol the gelatin coagulated and entrapped air bubbles and yeast cells within the coagulated mixture. The mixture was dried at 80° C. in an oven. The resulting dry product dispersed in water unless it was heat treated, such as for about 10 minutes at 195° C. The heat treated product was spongy in texture and could asborb water. The absorbed water could be squeezed out and reabsorbed without much damage to the texture. Both the wetted and the dried products were chewable with an acceptable mouthfeel.

EXAMPLE 2

The procedure in Example 1 was repeated except that the ethanol-containing whipped mixture was heat treated in an autoclave at about 15 psig. and about 121° C. for about 30 minutes to fix the texture. Then the autoclaved product was dried in a hot air oven at 80° C. The dry product did not disperse in water and had desirable organoleptic characteristics.

EXAMPLE 3

The procedure in Example 1 was repeated except that instead of whipping the mixture while ethanol was being added, the white coagulate formed at the interface was pulled in the form of a film. The film contained both gelatin and yeast cells and its texture could be fixed by autoclaving or by drying and heating at about 185°–195° C. for 15–30 minutes.

EXAMPLE 4

The procedure in Example 1 was repeated except that instead of gelatin, Supro-7 (soy isolate sold by Ralston Purina) was used as the solvent-coagulable texturizing agent. No visible coagulation which would form large textured chunks could be observed upon ethanol addition. Instead, small coagulated particle formation accompanied by separation of relatively clear liquid took place. The coagulated particles contained both yeast cells and Supro-7 and they had a crumbly hand feel. Both a dried and heat treated product and an autoclaved and dried product had a ground beef-like texture upon wetting.

EXAMPLE 5

The procedure in Example 4 was repeated except that instead of ethanol, acetone was used as the coagulating solvent. Large textured chunks were obtained but the final heat treated products had an undesirable aroma.

EXAMPLE 6

Example 1 was repeated except that instead of gelatin, a 1 to 1 mixture of gelatin and Supro-7 was used as the solvent-coagulable texturizing agent. Large chunks of textured product were obtained which had sponge-like absorption characteristics with good flexibility and mouthfeel.

It will be apparent to those skilled in the art that many variations from the specific examples, shown for purposes of illustration, can be made without departing from the scope of this invention.

We claim:

1. A process for texturing a whole cell single-cell protein material which contains at least 15 percent protein comprising:
   (a) mixing a slurry of said single-cell protein material with a solvent-coagulable proteinaceous texturizing agent at a weight ratio of the single-cell material to the texturizing agent of from about 9:1 to about 1:1;
   (b) adding an alcohol coagulating solvent to the mixture in sufficient quantity to coagulate the mixture while whipping the mixture to produce a microporous texture thereto during coagulation; and
   (c) thermally fixing the texture by heat treating the coagulated mixture at a temperature of from about 80° to about 250° C.

2. The process of claim 1 wherein the solvent-coagulable texturizing agent is gelatin and the coagulating solvent is ethanol.

3. The process of claim 1 wherein the solvent-coagulable texturizing agent is soy isolate and the coagulating solvent is ethanol.

4. The process of claim 1 wherein the solvent-coagulating texturizing agent is a mixture of gelatin and soy isolate and the coagulating solvent is ethanol.

5. The process of claim 1 wherein the single-cell protein material is a yeast.

6. The process of claim 5 wherein the yeast is *Candida utilis*.

7. A process for texturizing a whole cell single-cell protein material which contains at least 15 percent protein comprising:
   (a) mixing an aqueous slurry containing about 10–20 weight percent of said single-cell material with a texturizing agent selected from the group consisting of gelatin, soy isolate, or a mixture thereof wherein the dry weight ratio of the single-cell material to the texturizing agent is from about 9:1 to about 1:1;
   (b) adding ethanol in sufficient quantity to coagulate the mixture while whipping the mixture to produce a microporous texture thereto during coagulation; and
   (c) thermally fixing the texture by heat treating the coagulated mixture at a temperature of from about 100° to about 250° C.

8. The process of claim 7 wherein the whipped mixture is dried and then thermally fixed by heat treating at about 195° C. for about 10 minutes.

9. The process of claim 7 wherein the whipped mixture is thermally fixed by autoclaving the mixture at about 120° C. for about 30 minutes.

10. The process of claim 9 wherein the autoclaved mixture is dried.

11. The process of claim 10 wherein the single-cell protein material is a yeast.

12. The process of claim 11 wherein the yeast is *Candida utilis*.

13. The textured product made by the process of claim 7.

14. The textured product made by the process of claim 8.

15. The textured product made by the process of claim 9.

16. The textured product made by the process of claim 12.

* * * * *